May 21, 1968 R. R. OLSON 3,384,558

SOLAR DISTILLATION APPARATUS

Filed May 24, 1965

INVENTOR
RAYMOND R. OLSON

BY Brown, Jackson,
Boettcher & Dienner

ATTORNEYS

United States Patent Office 3,384,558
Patented May 21, 1968

3,384,558
SOLAR DISTILLATION APPARATUS
Raymond R. Olson, Oak Park, Ill., assignor to Solar Liquid Heating Company, Chicago, Ill., a corporation of Illinois
Filed May 24, 1965, Ser. No. 458,328
5 Claims. (Cl. 202—177)

ABSTRACT OF THE DISCLOSURE

Arrangement wherein sea water is preheated as it flows from the supply source to the evaporation chamber of a distillation unit by directing its flow through closely arranged high heat conductive tubes of narrow circular cross section which are passed through channels of larger cross sectional interior having insulated base, end and side walls and a top transparent wall, the channels being inclined to face the sun and the base wall serving to support the tube being planar so that the tubes are substantially completely surrounded by an atmosphere of limited volume which is heated by the sun rays and isolated from the outside air.

---

This invention relates to fluids distillation apparatus generally and has specific application to apparatus useful for heating fluids such as sea or other salt-containing water which it is desired to convert to fresh water, as by a distillation process.

A principal object of the invention is to provide means and method of mass heating fluids for distillation purposes in a highly efficient and economical manner.

A further object is to provide means by which sea water or other fluid can be heated by energy derived from the sun rays in such an efficient manner that the fluid can be raised to a relatively high temperature as it is pumped from the source of supply into the evaporation chamber, whereby a minimum amount of other forms of energy will be required to complete the evaporation of the fluid to effect its separation from the salts or other contaminants with which it was originally combined.

Thus it is a feature of the present invention that sea water or other fluid is preheated before it enters the evaporation chamber of a distillation unit, by passing the fluid through high heat conductive metal tubes of narrow circular cross-section which are disposed in closely spaced relation and in substantially inclined planes facing the sun and so as to be completely surrounded by a solar heated atmosphere which is of limited volume and isolated from the outside air.

In accordance with the invention, said tubes through which the fluid is pumped from the source of supply into the evaporation chamber of a distillation unit are divided into several series. Each series will comprise at least one, and preferably several, such tubes arranged in closely-spaced parallel relation and rested on the inclined base and between the side walls of a channel member, at least the inner portion of said side walls of the channel members which come in contact with the tube being of low heat conductive highly insulative material. The ends of the channel members, through which the tubes protrude for connection to appropriately located feed and discharge headers, are also plugged with insulating material and the top of the channel member is covered by a transparent wall. Both said transparent top wall and the end plugs are also sealed to the channel member to provide an atmosphere therein which is isolated from the outside and to which the entrance of dirt and moisture is barred. Because the tubes of each series have a circular cross section, they have only essentially linear contact with the base wall of the channel member which supports them and are therefore essentially completely surrounded by the atmosphere of the channel member. These channel members including their transparent wall and the tubes which they support are disposed in parallel relation and so inclined to the horizontal as to face the equator and to have maximum exposure of the thus insulated atmosphere to the heating rays of the sun which are thus trapped therein. Of consequence a volume of highly concentrated heat is rapidly developed within the confines of each channel member through which the fluid must flow. Because the tubes in which the fluid flows through these thus highly heated atmosphere are of narrow cross section and also of highly heat conductive metal, there is such an efficient transfer of the heat of said atmosphere to the fluid as to permit an uninterrupted flow of hot fluid from the source of supply into the evaporation chamber and which will require only a minimum of auxiliary heating in the evaporation chamber to raise the fluid to its boiling point and to complete the heating part of the distillation process.

Many other objects, advantages and/or features of the invention will be at once apparent or will be realized in the practice thereof as represented by the preferred embodiment of the invention which will now be described in connection with the accompanying drawings.

In said drawings:

FIGURE 4 is a fragmented sectional view taken through one end of one said channel member.

Figure 1:
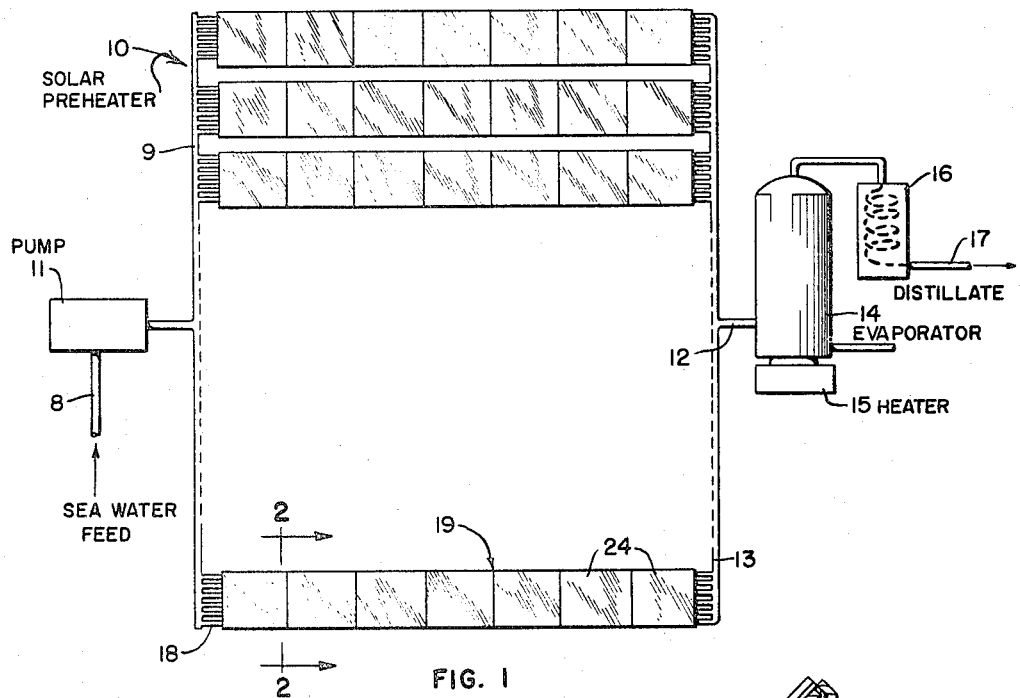
FIGURE 1 is a schematic view illustrating one form of the invention.

Referring now more particularly to the several views, and wherein it will be understood like parts are identified by like reference numerals, FIGURE 1 illustrates one form of a distillation unit constructed in accordance with the present invention. Such a unit is shown comprising a conduit 8 which leads from a supply of a contaminated liquid to be distilled, e.g. sea water, to the entrant header 9 of a preheater identified generally by reference numeral 10. Preheater 10 may be of any size and in the normal installation will cover several acres. At 11 is a pump located in conduit 8 enforcing flow of fluid through the preheater 10 into a heat-insulated conduit 12 which leads from the exit header 13 of the preheater to the evaporation channel 14 of the distillation unit. At 15 is an auxiliary heater which is used to raise the temperature of the fluid entering chamber 14 to its boiling point to effect separation of the fluid from its contaminants by its gasification. Heater 15 may be oil, coal or gas fired. It also may be energized by electrical power or by any other form of locally available inexpensive source of energy. The gas forming in chamber 14 is collected at 16 where it is cooled and condensed back to liquid form, the liquid being discharged through pipe 17 for delivery to a storage tank or the like.

As shown in FIGURE 1, the preheater with which the invention is presently concerned, comprises a plurality of metal pipes or tubes 18 which are arranged in parallel relation and extend between said mentioned inlet and exit headers 9 and 13 respectively. Tubes 18 are divided into a number of series, each series preferably comprising the same number of tubes and being disposed in closely spaced parallel relation and enclosed within a solar heat trap constituting member 19.

Figure 2:
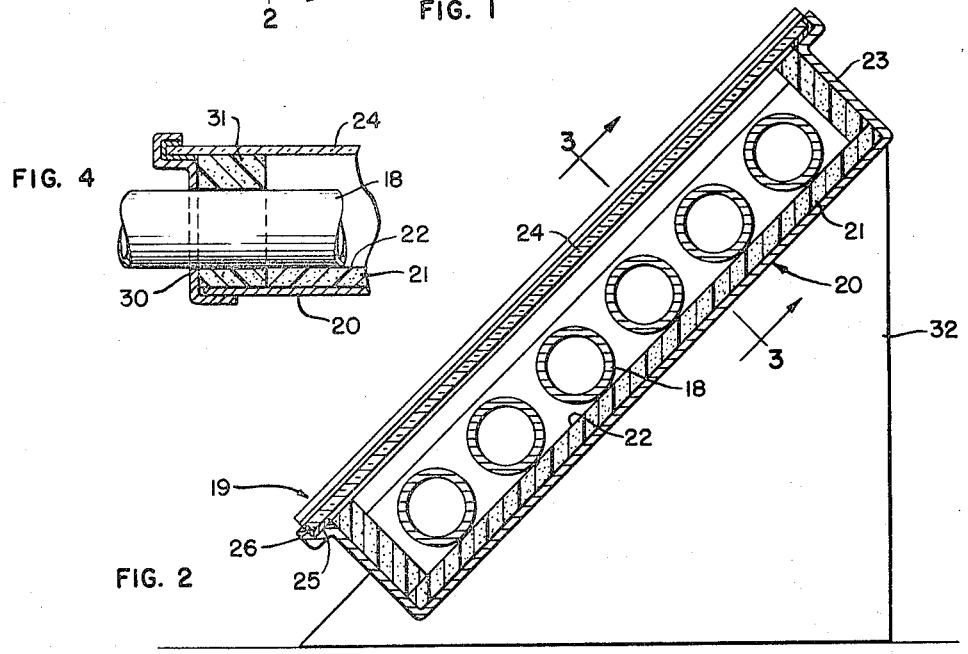
FIGURE 2 is a sectional view taken along lines 2—2 of FIGURE 1, looking in the direction indicated by the arrows showing details in the construction of the channel members which enclose each series of tubes for solar preheating of the fluid which is passing therethrough to the evaporator for distillation.
Figure 3:
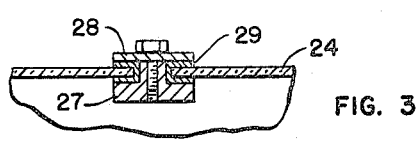
FIGURE 3 is a fragmented sectional view taken along lines 3—3 of FIGURE 2 showing further details in the construction of said channel member.

As shown best in FIGURE 2, each of said solar heat trap members 19 comprise an elongated metal box-like structure 20 having a base and side walls which extend lengthwise of the tubes 18 and end closures through which the tubes 18 extend. Lining the interior of member 20 is a thickness 21 of a highly insulative material of low heat conductivity, such as rigid styrofoam. Tubes 18 are of a material such as aluminum, titanium, or stainless steel, which is substantially resistant to the effects of corrosion by the sea water, and at the same time have relatively high coefficient of heat conductivity. They are also of relatively narrow circular cross section and have essentially only linear contact with the supporting surfaces 22 of the channel members 19 on which they rest. Side walls 23 of the channel members need have a height only slightly greater than the diameter of the tubes 18 and provide support for enclosing transparent wall comprising a plurality of end to end glass panels 24 supported thereby parallel to base 22 of the channel member and tubes 18 supported on said base. For this purpose the upper edges of side walls 23 are recessed at 25 to provide seats which receive the opposed side margins of the glass panels 24, these seats being lined with a suitable gum or other gasket material 26 to effect a dirt or moisture type seal.

In order to afford rigidity to the construction, reinforcing cross braces 27 are secured at regular intervals to adjacent the top edges of the side walls 23 of the channel members. The top surface of these braces also provides support or seats on which to rest the adjacent ends of the glass panels 24. Preferably the ends of the glass panels are enclosed by attached pieces 28 which are bolted or otherwise secured to the braces 27. Gasket means 29 is also provided between and about the thus supported ends of the glass panels 24.

As illustrated in FIGURE 4, the ends of the channel members 19 are closed by metal pieces 30 through which the tubes 18 extend for connection to the respective headers 11, 13. The interior side of these metal enclosure pieces 30 are also lined with a highly insulative material 31, such as the aforementioned styrofoam material so as to complete the formation of an insulated atmosphere substantially completely enclosing tubes 18 and having a transparent wall 24 through which the rays of the sun may enter. At 32 are supporting means by which members 19 are so mounted that their transparent wall comprising glass panels 24 is inclined to the horizontal and to face the equator. Such supporting means may be of any suitable construction, for example, they may comprise spaced footings of concrete. For the most efficient exposure of the transparent wall 24 to the sun's rays, members 19 are thereby set so that tubes 18 run parallel to the earth's latitude and are inclined with transparent wall 24 at an angle to the horizontal affording exposure to the rays of the sun for a maximum number of the daylight hours of each day. According to Farrington Daniels "Direct Use of the Sun's Energy" 1964 Yale University Press, during the winter months this angle would be approximately 15° greater than the latitude in which the solar heat trap would be located, whereas during the summer months it would be set at an angle equal to about 15° less than said latitude. A good compromise for a permanent installation would be an angle corresponding to the latitude in which the distillation unit was to be used. Thus, if the unit were to be located near Chicago, Ill., whose latitude is approximately 42° north, then channel members 19 would be set so that their base and transparent wall would be set at 42° to the horizontal and extending in an east and west direction and their transparent wall 24 facing south. In addition, channel members 19 would not only be disposed parallel to each other but would also be spaced sufficiently apart as to provide a minimum of shadowing on the transparent wall of adjacent members. The actual spacing between each member 19 would, of course, depend on the dimensions of the channel members employed in the installation.

The number of channel members 19, as well as their length and the number of tubes 18 contained therein, will be dependent upon the delivery rate of fresh water required from the installation. Ordinarily, preheater 10 will cover several acres and in any event will be sufficient to provide a steady flow of fresh water exiting from the evaporation unit as at 17.

As previously stated, tubes 18 are constructed of a material that is substantially non-corrosive to sea water or other fluid being passed therethrough, but in accordance with the invention are also of a metal having a relatively high coefficient of heat transfer. Examples of such metals include aluminum, titanium and stainless steels.

A feature of the invention is that tubes 18 are heated by reason that they are substantially completely enclosed or surrounded within a superheated atmosphere, which, although heated by energy derived from sun rays passing through their transparent wall 24, is isolated from the outside air by the insulating liner 21 of the channel members 19. As already described, tubes 18 are rested against the base 22 of the channel members 19. However, because tubes 18 are of circular cross section, they have essentially only linear contact with said surface, and because the tubes are also slightly spaced apart the thus super heated atmosphere of the channel members substantially completely encloses and/or surrounds the tubes 18. The surface 22, on which the tubes 18 rest, is of a highly insulative material and therefore of poor heat conductivity. In addition, it has only linear contact with said tubes, wherefore it has substantially no heat dissipating effect on the tubes and the fluid passing therethrough. If tubes 18 and the insulating material 21, comprising the inner surface of the channel members 19, are not of a dark dull material, then their interior surfaces should be coated as by painting a dark black color and, in any event, so that the interior surfaces of the members 19, other than their glass panels 24, are of relatively low light reflectivity and have high heat absorption characteristics. This further insures sufficient transfer of heat from the superheated atmosphere of the channel members through the tube walls to the fluid passing therethrough.

In practice, tubes 18 will have a diameter of about 2 to 4″ and although the actual number of tubes provided each channel member may vary, from 3 to 8 tubes will permit a relatively close spacing of the several channel members 19 without shadowing of adjacent members so as to maximize the number of tubes 18 and therefore the flow rate through the preheater 10. In its preferred form, channel members 19 will only be slightly larger than the tubes 18 contained therein. Thus, preferably, channel members 19 will have dimensions such as to provide an enclosing superheated atmosphere about the tubes of a volume equal to about twice to eight times the total volume represented by the tubes themselves as contained in the respect to channel members 19. Depending on the length of the tubes 18, and therefore the length of the superheated atmosphere through which the fluid passes, it can be expected that in the preheater the fluid can be raised approximately 100° F. over the outside air temperature so as to enter the evaporation chamber of the distillation installation at a temperature close to or above the boiling point of the sea water and wherefore only a very minimum amount of fuel will be required to complete the evaporation and therefore separation of the water from its contaminants. Illustrative thereof, in one pilot operation where 50 feet of ¼″ copper tubing was extended through an insulated chamber having a transparent wall on one side facing the sun as described, and of interior dimensions to provide a superheated atmosphere about the tubes of a volume about seven times that of the tubes, it was found that when water flowed through the tubes at the rate of 150 ft. an hour, the exiting water was raised from an entering temperature of 60° F. to a temperature of 190° F, or almost the boiling point of the water itself.

As thus described, it will be appreciated that all of the recited objects, advantages and/or features of the invention have been demonstrated as obtainable in a highly efficient and entirely practical and economical manner. It will be further understood that although the invention has thus been described as specifically useful in the distillation of sea water and/or in the purification of other waters, as for example those contaminated with undersirable minerals, the invention will have utility in such widely diversified distillation processes as those involving distillation of petroleum products and in various acid manufacturing processes.

Thus having described my invention, I claim.

1. Salt-containing water distillation apparatus comprising, in combination, a preheater and an evaporator, said preheater including a first header connected to a source of salt-containing sea water, a second header connected to the inlet of an evaporation chamber of said evaporator, and a plurality of series of closely spaced planar-arranged parallel tubes of high heat conductive material connected between said headers, a pump enforcing flow of sea water from the first header through each said series of tubes into said second header and to the evaporation chamber, a plurality of channel members each having a larger hollow interior comprised by a planar base and opposed side walls of low heat conductive highly heat insulative material disposed about each said series of tubes and extending lengthwise thereof, the tubes being of circular cross-section and each tube resting on the planar base of the channel members in closely spaced generally parallel relation and so that each tube has essentially only linear contact with said planar base, the ends of said channel members being closed by highly heat insulative material, and a wall transparent to sun rays disposed over said tubes and sealed to said sides and ends of each said channel members providing an enclosed atmosphere therein heated by the sun rays which substantially completely surrounds the tubes which are heat insulated from the surrounding outside air, said channel members supporting said series of tubes and transparent wall being positioned at an angle to the horizontal and corresponding to the latitude in which the apparatus is used and facing the earth's equator to provide maximum exposure to the sun rays, the interior surface of said channel members including its sides, ends and base and the exterior of said tubes being of dark dull color and of poor light reflectivity and having high heat absorption characteristics, the sealed atmosphere of said channel members which surrounds the tubes being thereby rapidly heated by the sun rays to a temperature above that of the outside air causing the sea water as it passes through said tubes to be raised to a temperature where it approaches the boiling point of said water, auxiliary heating means for heating said evaporator which complete the heating of said sea water in the evaporation chamber to its boiling point to effect its conversion into water vapor and separation from the salt, and condenser means connected to said evaporator for condensing said water vapor to recover water as distillate.

2. The combination of claim 1 wherein the transparent wall comprises a plurality of end-to-end related glass panels and the channel member has spaced braces secured to adjacent the upper edges of its side walls on which the glass panels rest.

3. The combination of claim 1 wherein the interior volume of said channel member is from two to eight times that of the tubes arranged therein.

4. The combination of claim 1 wherein the interior volume of said channel member is about seven times the volume of the tubes therein.

5. The combination of claim 1 wherein the interior surface of the channel member and the exterior of the tubes therein are coated with a dark black coating.

References Cited

UNITED STATES PATENTS

| | | | |
|---|---|---|---|
| 102,633 | 1870 | Wheeler et al. | 202—234 X |
| 2,247,830 | 7/1941 | Abbot | 202—234 X |
| 2,490,659 | 12/1949 | Snyder | 202—205 |
| 2,843,536 | 7/1958 | Mount | 202—234 X |
| 2,902,028 | 9/1959 | Manly | 202—234 X |
| 3,015,613 | 1/1962 | Edmondson | 202—187 X |
| 3,190,816 | 6/1965 | Adamec | 202—234 X |
| 3,232,846 | 2/1966 | Kimmerle | 202—185 X |

FOREIGN PATENTS

| | | |
|---|---|---|
| 442,502 | 1948 | Italy. |
| 883,117 | 1943 | France. |
| 681,133 | 1930 | France. |

NORMAN YUDKOFF, *Primary Examiner.*

F. E. DRUMMOND, *Assistant Examiner.*